May 7, 1957  J. E. PELTIER  2,791,389
TEMPORARY SUPPORT MEANS FOR MULTI-WIRE CABLES
Filed Feb. 1, 1956
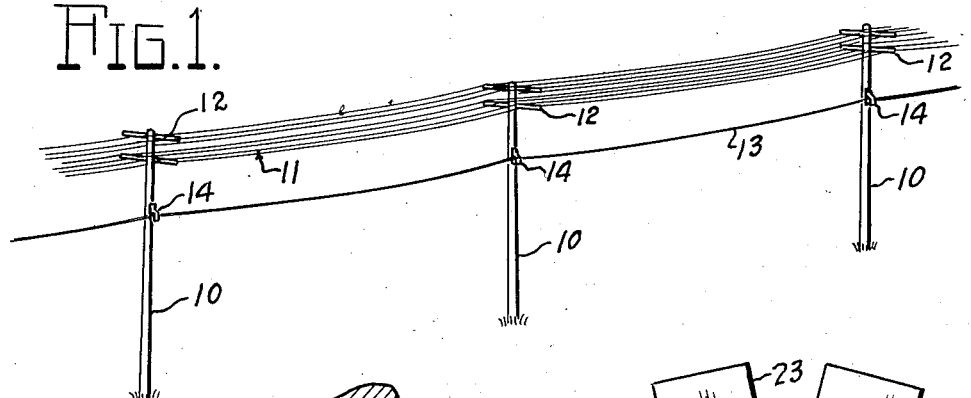
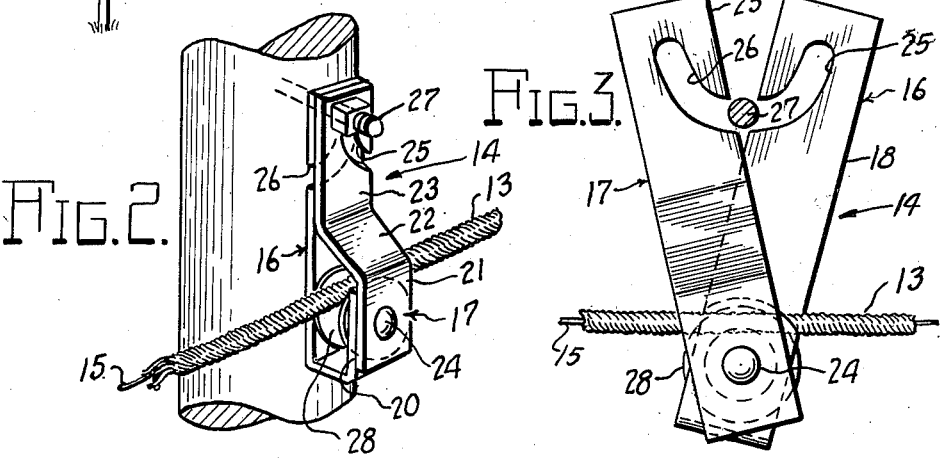
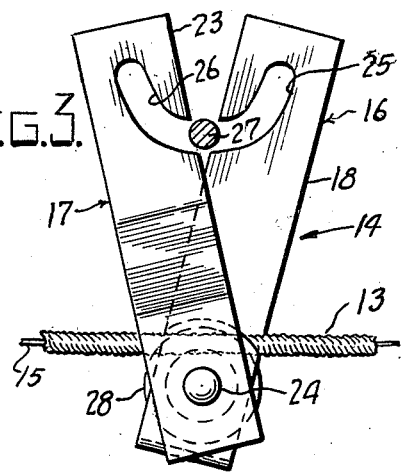
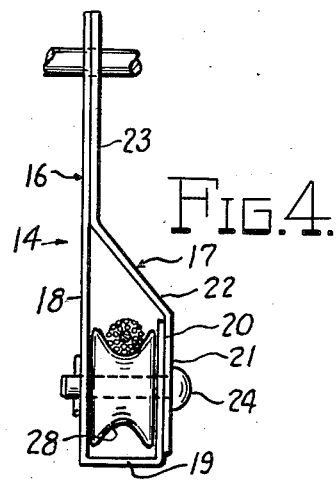
INVENTOR.
James E. Peltier
BY
Owen & Owen
ATTORNEYS

United States Patent Office 2,791,389
Patented May 7, 1957

2,791,389

TEMPORARY SUPPORT MEANS FOR MULTI-WIRE CABLES

James E. Peltier, Port Clinton, Ohio

Application February 1, 1956, Serial No. 562,905

1 Claim. (Cl. 248—55)

This invention relates to a temporary support means for a multi-wire cable and is particularly designed for the purpose of temporarily supporting telephone cables during the time they are being strung from pole to pole and for facilitating the tightening of the cables.

When multiple lead cables are strung, for example, to provide emergency service, to provide temporary service, or for some other purpose, it is usually customary to use less expensive cables consisting of anywhere from a dozen to several dozen individual conductors grouped and twisted together. These multiple lead cables are strung from pole to pole for a considerable distance and then are tightened over the several pole span and subsequently are fixed at each pole.

It is the object of this invention to provide a simple, quickly mountable and demountable fitting which will serve to temporarily support a multiple conductor cable while it is being placed and tightened along a distance spanning several successive telephone poles and yet which can be easily removed after the cable is tightened so that the cable can be at least semi-permanently fixed to the several poles.

More specific objects and advantages of a device embodying the invention will be better understood from the specification which follows and from the drawings in which:

Fig. 1 is a fragmentary view in perspective showing a plurality of telephone poles spaced from each other and supporting a temporary cable upon devices embodying the invention;

Fig. 2 is a fragmentary view in perspective showing a temporary hanger embodying the invention in which a multiple conductor cable is positioned for temporary support during the tightening of the cable;

Fig. 3 is an enlarged front view in elevation of a support device embodying the invention and illustrating how it is placed on and removed from a support bolt;

Fig. 4 is a side view in elevation of a device embodying the invention shown in its closed or mounted position.

As an illustration of the utility of the device embodying the invention, Fig. 1 shows three spaced telephone poles 10 between which are strung a plurality of permanent cables generally indicated at 11 and supported usually upon cross arms 12. Under many circumstances it is desirable to mount a temporary additional cable or cables for the purpose of providing short time emergency or other temporary service. Such cables usually consist of a plurality of individual, separately insulated conductors twisted together to form a loose group numbering from a dozen to several dozen individual insulated wires. A cable of this type is indicated in Fig. 1 at 13 and shown as supported by temporary support means 14 embodying the invention which facilitate the original erection of the cable upon the poles 10 and the tightening of the cable in place.

The cable 13 as shown in Fig. 2, may comprise a plurality of individual wires twisted together around a central support wire 15 usually consisting of a strand of high tensile strength steel which supports the weight of the conductors.

A device 14 embodying the invention comprises an L-shaped back plate 16 and a bent front plate 17. The back plate 16 has a main leg 18, a forwardly turned bottom web 19 and a short, upwardly directed front leg 20 parallel to and spaced from the back leg 18. The front plate 17 has a straight portion 21, a rearwardly angled portion 22 and a flat upper portion 23 parallel and adjacent to the rear leg 18 of the back plate 16. The two plates 16 and 17 are pivotally connected to each other by a pin 24 extending horizontally through the lower portion 21 of the front plate 17 and both arms 20 and 18 of the back plate 16. Near the top of the longer leg 18 of the back plate 16 and of the upper portion 23 of the front plate 17 (Fig. 3) the back and front plates 16 and 17 are slotted with a pair of oppositely opening slots 25 and 26. When the two plates 16 and 17 are angularly swung relative to each other as shown in Fig. 3, they may be moved upwardly to align a support bolt 27 with the open ends of the slots 25 and 26 and then may be swung together and moved downwardly to catch the support bolt 27 in the slots 25 and 26 at their upper ends in order to support the hanger 14 on the bolt 27.

When the device 14 is in the position shown in Fig. 3 the cable 13 may be inserted between the plates 16 and 17 or removed from between the plates 16 and 17. A roller 28 is journaled on the pin 24 between the front and rear arms 20 and 18 of the back plate 16. The roller 28 supports the cable 13 and also allows it to be moved longitudinally without damage to the insulation of the conductors in the cable 13 when the cable 13 is tightened. A cable of this type is strung along for a number of telephone poles being temporarily supported in the individual devices 14 quite loosely as it is thus temporarily positioned. After the cable has been placed along a substantial span, possibly as much as one-quarter to one-half mile, a winch is applied to the free end of the cable and it is stretched tight over the rollers 28.

A lineman then climbs each of the poles 10 and, by lifting the device 14 and swinging its front and back plates 16 and 17 to the position shown in Fig. 3, the device 14 is disengaged from its support bolts 27 and removed from around the cable 13. Since the cable 13 has been stretched tightly it does not sag a sufficient distance to elude the lineman and he can separate its central support strand 15 from the conductors of which the cable 13 is comprised.

Having described the invention, I claim:

A temporary support device for a multi-wire cable consisting of a back plate having a long vertical leg, a horizontal forwardly extending web attached to the lower end of said leg and a short vertical leg on the front of said web extending upwardly in spaced parallel relation to said long leg, a front plate having a lower portion overlapping said short vertical leg, a rearwardly extending angular portion and an upper portion parallel to said lower portion, a horizontal pin extending through said lower portion of said front plate and through both legs of said back plate pivotally connecting said plates to each other with the upper portions of said plates closely adjacent and parallel, and a roller journalled on said pin between the legs of said back plate, there being oppositely directed, upwardly extending angularly positioned slots in the upper portions of said plates leading from opposite sides thereof to the center and being aligned at the upper center when said plates are in overlapping relationship whereby said device is supportable on a bolt passing through the aligned portions of the slots, and whereby the device may be removed from said support by the application of an upward thrust thereto causing the slots to slide along the bolt and the plates to pivot on the pin.

References Cited in the file of this patent

UNITED STATES PATENTS

| | | |
|---|---|---|
| 1,348,534 | Beine | Aug. 3, 1920 |
| 1,963,908 | Manasek | June 19, 1934 |
| 2,566,233 | Makie | Aug. 28, 1951 |